(12) United States Patent
Takai et al.

(10) Patent No.: US 7,117,110 B2
(45) Date of Patent: Oct. 3, 2006

(54) MEASURING METHOD AND MEASURING APPARATUS

(75) Inventors: Nozomi Takai, Tsuchiura (JP); Masaaki Oguri, Tsuchiura (JP)

(73) Assignees: Tokyo Semitsu Co., Ltd., Tokyo (JP); Tosei Engineering Corp., Ibaraki (JP)

( * ) Notice: Subject to any disclaimer, the term of this patent is extended or adjusted under 35 U.S.C. 154(b) by 0 days.

(21) Appl. No.: 10/902,838

(22) Filed: Aug. 2, 2004

(65) Prior Publication Data

US 2005/0033551 A1 Feb. 10, 2005

(30) Foreign Application Priority Data

Aug. 4, 2003 (JP) .............................. 2003-285852

(51) Int. Cl.
*G01D 18/00* (2006.01)
(52) U.S. Cl. ......................................... 702/90; 33/702
(58) Field of Classification Search ............ 702/85–88, 702/90, 91, 94, 95, 97, 105, 127, 147, 150, 702/158, 167, 168, 832; 33/832, 702, 77.04, 33/554; 360/77.04, 34; 700/34
See application file for complete search history.

(56) References Cited

U.S. PATENT DOCUMENTS

| | | | | |
|---|---|---|---|---|
| 4,536,809 A | * | 8/1985 | Sidman | 360/77.04 |
| 4,679,326 A | * | 7/1987 | Takizawa et al. | 33/832 |
| 4,736,208 A | * | 4/1988 | Schmidt | 346/33 R |
| 4,905,676 A | * | 3/1990 | Bond et al. | 601/34 |
| 5,148,377 A | * | 9/1992 | McDonald | 702/95 |
| 6,125,337 A | | 9/2000 | Rosenberg et al. | 702/153 |
| 6,209,217 B1 | * | 4/2001 | Tsuruta et al. | 33/554 |
| 6,295,866 B1 | * | 10/2001 | Yamamoto et al. | 73/105 |
| 2002/0066197 A1 | * | 6/2002 | Sano et al. | 33/549 |
| 2002/0087233 A1 | | 7/2002 | Raab | 700/262 |

FOREIGN PATENT DOCUMENTS

| | | |
|---|---|---|
| EP | 1 043 564 A2 | 10/2000 |
| EP | 1043564 | * 10/2000 |
| JP | 10-019545 | 1/1998 |
| JP | 10-19545 | 1/1998 |

OTHER PUBLICATIONS

European Search Report issued Dec. 21, 2004.

* cited by examiner

*Primary Examiner*—Marc S. Hoff
*Assistant Examiner*—Mohamed Charioui
(74) *Attorney, Agent, or Firm*—Harness, Dickey & Pierce

(57) ABSTRACT

In a measuring apparatus, a plurality of design values in design values substituted in the correction computation equations for correcting a geometrical measurement error inherent in the measuring apparatus are set as variables, the variables are optimized by a numerical solution to obtain optimized correction computation equations. A measured value is computed by using the optimized correction computation equations obtained. For optimization of the variables, a master work is measured and the variables are adjusted so that a measurement error is minimized.

5 Claims, 3 Drawing Sheets

MEASURING METHOD AND MEASURING APPARATUS

BACKGROUND OF THE INVENTION

1. Field of the Invention

The present invention relates to a measuring method and apparatus and, more particularly, to a measuring method and apparatus capable of optimally correcting a geometrical measurement error inherent in a machine control gage, a surface roughness profile measuring device or the like incorporated in a grinding machine or the like.

2. Description of the Related Art

In machine control gages (automatic sizing devices), surface roughness contour measuring devices or the like incorporated in grinding machines or the like, a measuring head is used which has a seesaw member having a probe at its end and supported by a supported member so as to be rotatable on the supporting member, an urging member which urges the seesaw member in one direction, and a detector which is provided on the opposite side of the seesaw member from the probe as seen from the supporting member, and which detects a displacement of the probe by detecting a displacement of the seesaw member.

This detector is, for example, an optical digital scale including a reading head fixed on the measuring head body and a circular-arc scale attached to the seesaw member, or a linear voltage differential transducer or transformer (LVDT) (popularly called a differential transformer) including a differential coil portion fixed on the measuring head body and a core attached to the seesaw member and inserted in the differential coil portion.

The amount of movement of the probe is detected as a pulse count value of the optical digital scale (detected as a change in voltage in the case of LVDT). This detected value is processed in a computation processing unit to be obtained the amount of movement.

In machine control gages, a measuring head constituted by one seesaw member and capable of measuring a displacement in one place by one probe, a caliper-type measuring head having a pair of seesaw members and capable of pitching an object to be measured between two probes opposed to each other to measure the outside diameter of the object, and the like are used.

In the case of measurement of the position of a flat surface (thickness, for example) with such a seesaw-type measuring head, an error occurs since a displacement is measured as an angle. In the case of measurement of a curved surface, e.g., measurement of the outside diameter of a cylindrical work, an error occurs due to a shift of the probe contact point.

To reduce the influence of these geometrical error factors, various devices or methods have been proposed (see, for example, Japanese Patent Application Publication No. 10-19545).

In the size measuring apparatus described in Japanese Patent Application Publication No. 10-19545, correction data for correction through the entire measurement range is obtained in advance and is stored in a memory. At the time of measurement, a measured value is corrected by reading out the corresponding correction data from the memory.

SUMMARY OF THE INVENTION

According to the conventional art described in Japanese Patent Application Publication No. 10-19545, it is necessary to perform the process of obtaining correction data through the entire measurement range in such a manner that a number of master works the size of which is known are prepared as size references covering the entire measurement range and are measured to obtain correction data.

In use of a measuring device such as a machine control gage, there is a need to change or adjust a finger constituting a portion of the seesaw member or the probe attached to an end of the finger according to a work to be measured. It is practically impossible for an ordinary user to measure many master works in order to obtain correction data each time such replacement or adjustment is performed.

For other types of measuring apparatus, methods of making correction by computing a geometrical error such as a circular-arc error instead of correction data have frequently been used. However, this geometrical error correction by computation is incapable of correction with sufficiently high accuracy for high-precision measurement because the size of each component of the measuring apparatus includes an error relative to a design value.

In view of the above-described circumstances, an object of the present invention is to provide an accurate measuring method and apparatus in which a user can easily correct a measurement error inherent in a seesaw-type measuring device for example, and in which correction can be made with accuracy even if each component of the measuring apparatus has an error relative to a design value.

To achieve the above-described object, according to one aspect of the present invention, there is provided a measuring method in which a probe is brought into contact with a work to measure a size of the work, the method including storing correction computation equations capable of correcting a geometrical measurement error inherent in a measuring apparatus, the correction computation equations being used for computation based on design values, measuring a work and computing a measured value by using the correction computation equations, optimizing as variables, by a numerical solution, a plurality of design values in the design values substituted in the correction computation equations so that an error between the computed measured value and a true value is minimized, storing the optimized correction computation equations in which optimized variables are substituted, and computing the measured value by using the optimized correction computation equations in measurement subsequently performed.

To achieve the above-described object, according to another aspect of the present invention, there is provided a measuring apparatus including an arm member having a probe at the arm member's end and supported on a supporting member so as to be pivotable on the supporting member, a detector capable of detecting the amount of displacement of the probe by detecting the amount of displacement of the arm member, and a computation processing unit which computes a measured value from a detection signal from the detector, the computation processing unit having a storage device which stores correction computation equations for correcting a geometrical measurement error on the basis of design values, a measured value computation device which computes the measured value from the detection signal from the detector by using the correction computation equations, and an optimizing computation device which optimizes as variables, by a numerical solution, a plurality of design values in the design values substituted in the correction computation equations so that an error between the computed measured value and a true value is minimized, wherein the storage device stores the optimized correction computation equations in which the optimized variables are substituted, and measured value computation device computes the measured value by using the optimized correction computation equations.

According to the present invention, a plurality of design values in the design values substituted in the correction computation equations for correcting a geometrical measurement error inherent in the measuring apparatus are set as variables; the variables are optimized by a numerical solution to obtain optimized correction computation equations; and the measured value is computed by using the optimized correction computation equations obtained, thereby ensuring that even if each component of the measuring apparatus as an error relative to the design value, correction can be made with accuracy to enable high-precision measurement.

According to the present invention, there are also provided a measuring method and a measuring apparatus characterized in that a master work the size of which is known is measured and the variables are optimized so that the difference between the measured value obtained and the known size is minimized, and that at least one of a master work having a size corresponding to the upper limit of a measurement range and a master work having a size corresponding to the lower limit of the measurement range is used as the above-mentioned master work.

According to the present invention, the correction computation equations are optimized by using at least one of the master work having a size corresponding to the upper limit of the measurement range and the master work having a size corresponding to the lower limit of the measurement range. Thus, one or two master works other than a zero-point setting master work ordinarily used (a total of two or three master works) may suffice as a size-reference master work, and a user can easily optimize the correction computation equations to make a high-precision measurement.

As described above, the measuring method and the measuring apparatus of the present invention are capable of correcting, by optimized correction computation equations, a geometrical measurement error inherent, for example, in a measuring device of a seesaw type even if each component of the measuring apparatus has an error relative to the design value. Also, a user can easily optimize the correction computation equations to make a high-precision measurement.

DETAILED DESCRIPTION OF THE PREFERRED EMBODIMENTS

Figure 1:
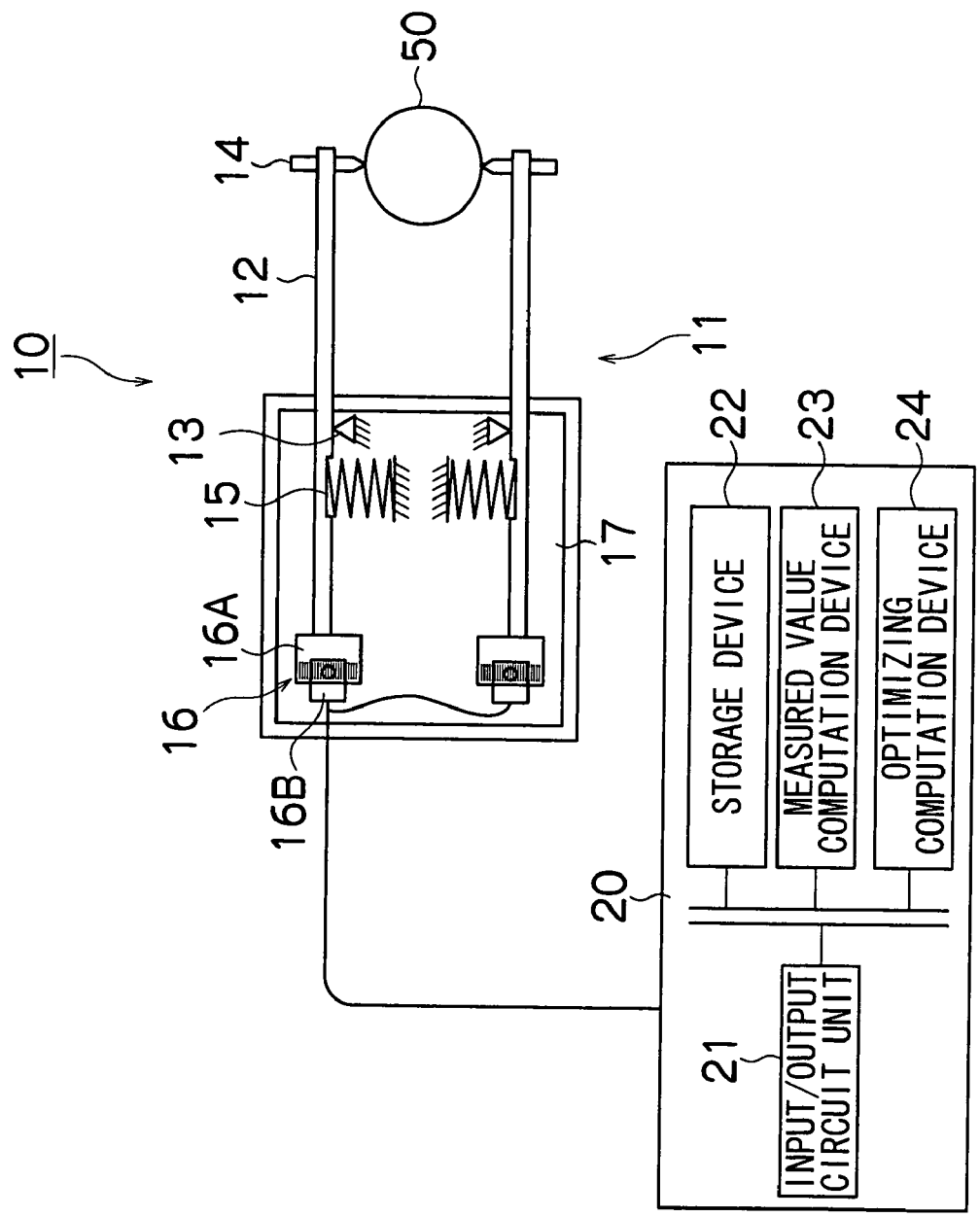
FIG. 1 is a diagram schematically showing a measuring apparatus in an embodiment of the present invention.

A preferred embodiment of a measuring method and a measuring apparatus in accordance with the present invention will be described with reference to the accompanying drawings. In the drawings, the same members are indicated by the same reference numerals or characters.

FIG. 1 is a diagram schematically showing a measuring apparatus 10 in accordance with the present invention. The measuring apparatus 10 includes a caliper-type measuring head 11 with which the outside diameter of a work 50 is measured, a computation processing unit 20 for performing computation processing of measurement data, and a display unit (not shown).

The measuring head 11 has a pair of arm members 12 which are each supported on a supporting member 13 so as to be rotatable on the supporting member 13, a pair of probes 14 which are respectively attached to ends of the corresponding arm members 12, and which contact a work 50, urging members 15 which act on the arm members 12 to urge the probes 14 toward the work 50, and each of which is formed of a compression spring, and a pair of detectors 16 each having a scale 16A fixed on an end surface of the arm member 12 opposite from the probe 14 as seen from the supporting member 13, the detector 16 also having a reading head 16B fixed on a head body 17.

The pairs of members including the pair of arm members 12, the pair of probes 14 and the pair of detectors 16 are placed in upper and lower positions so as to be symmetric about a horizontal line.

The computation processing unit 20 includes an input/output circuit unit 21, a storage device 22, a measured value computation device 23, and an optimizing computation device 24. These components are connected to each other via a bus line. Through the input/output circuit unit 21, signals are transferred between the computation processing section 20, the detectors 16, and the display unit. The storage device 22 stores detection signals and connection computation equations for correcting a geometrical error in a measured value.

The measured value computation device 23 computes the measured value by using the correction computation equations on the basis of detection signals from the detectors 16. The optimizing computation device 24 has a program for optimizing design values used in the correction computation equations so that a geometrical measurement error is minimized. The optimizing computation device 24 corrects the correction computation equations prepared on the basis of design values into optimized correction computation equations.

Figure 2:
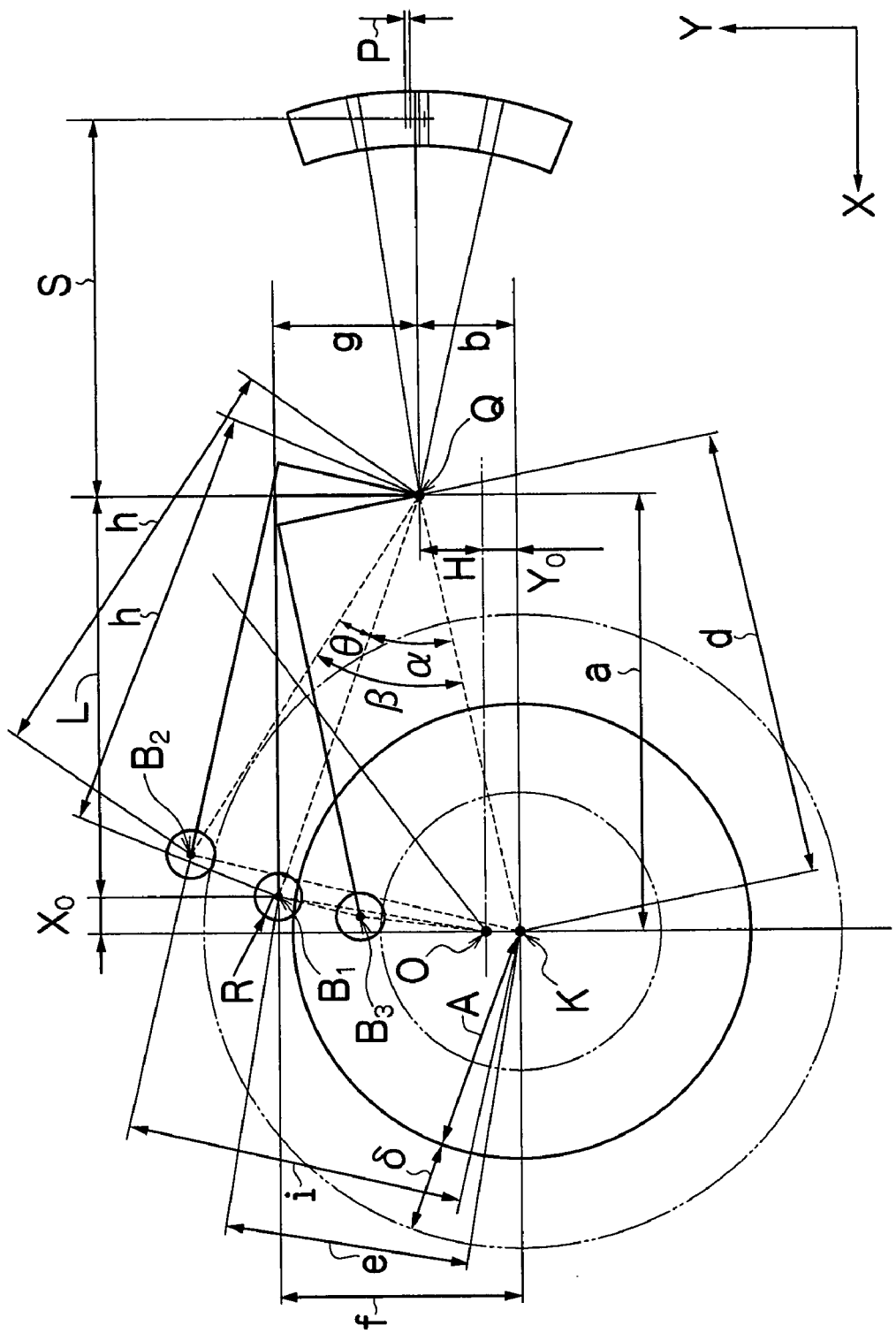
FIG. 2 is a schematic side view of a model of measurement using a spherical contact to measure a cylindrical work.

Description will now be made of the correcting computation equations for correcting a geometrical measurement error. FIG. 2 shows the state of contact between the probes 14 and the work 50 when three works 50 differing in diameter are measured. In FIG. 2, O indicates a design work center, while K represents the actual work center. Q indicates the rotation supporting point of the arm member 12, and each of $B_1$, $B_2$ and $B_3$ indicates the center of a sphere which contacts the works assuming that the end of the probe 14 corresponds to the sphere.

L represents the distance in the X-direction between the supporting point Q and the center $B_1$ of the sphere when the end of the probe 14 is in contact with the work having a diameter A, and S represents the distance in the X-direction between the supporting point Q and the scale read point when this contact is maintained. Also, $X_O$ represents the amount of shift of the sphere center $B_1$ in the X-direction relative to the center K of the work when this contact is maintained.

R represents the radius of the end sphere of the probe 14. $Y_O$ represents the amount of shift of the actual work center K in the Y-direction relative to the design work center O, and H represents the distance in the Y-direction between the design work center O and the supporting point Q.

An angle α is formed between a segment $QB_1$ and a segment connecting the supporting point Q and the work center K. An angle β is formed between a segment QK and a segment $QB_2$. An angle $\theta$ is formed about the supporting point Q by the movement of the end sphere of the probe 14 from $B_1$ to $B_2$.

An X-direction distance a is defined between Q and K, while a Y-direction distance b is defined between Q and K. A segment QK has a length d. A segment $KB_1$ has a length e. A Y-direction distance f is defined between K and $B_1$. A Y-direction distance g is defined between Q and $B_1$. The segment $QB_1$ and the segment $QB_2$ have a length h. A segment $KB_2$ has a length i.

If the pitch of the scale 16A is P; the number of electrical divisions at the time of scale reading is N; and the count made by the detector 16 when the arm member 12 rotates so that the end sphere of the probe 14 moves from the position at which it contacts the work having the radium A to the position at which it contacts the work having a radius A+δ, that is, when the arm member 12 rotates through the angle θ is C, the change δ in the work radius can be expressed by the following equations.

$$a = L + X$$

$$b = Y + h$$

$$d = \sqrt{(a^2 + b^2)}$$

$$e = A + R$$

$$f = \sqrt{(e^2 - X^2)}$$

$$g = f - b$$

$$h = \sqrt{(L^2 + g^2)}$$

$$i = A + \delta + R$$

$$e^2 = d^2 + h^2 - 2 \times d \times h \times \cos(\alpha)$$

$$\alpha = A33 \cos\{(d^2 + h^2 - e^2)/(2 \times d \times h)\}$$

$$i^2 = d^2 + h^2 - 2 \times d \times h \times \cos(\beta)$$

$$\beta = A \times \cos\{(d^2 + h^2 - i^2)/(2 \times d \times h)\}$$

$$\theta = \beta - \alpha$$

$$C = (S \times N \times \theta)/P$$

$$\theta = (C \times P)/(S \times N)$$

$$\beta = \theta + \alpha$$

$$i = \sqrt{\{d^2 + h^2 2 \times d \times h \times \cos(\beta)\}}$$

$$\delta = i - A - R \qquad \text{(Equation 1)}$$

The measured value is computed from the count C made by the detector 16 and the computation equations shown above, thereby correcting a geometrical error due to seesaw motion. However, $X_O$ and $Y_O$ in the computation equations shown above are unknowns. Also, while design numeric values exist for L, A, H, A and P, the actual dimensions cannot be ascertained with reliability.

If all of these numeric values are accurately measured, the accuracy of the computation equations shown above is increased. In actuality, however, it is difficult to measure some of them, and errors accompany the measurements. Also, adjustment of the probe 14 and a finger forming a portion of the arm member 12 may be performed on the user side. It is impractical to obtain measurements each time such portions are adjusted. According to the present invention, each numeric value is optimized by a procedure described below to obtain the measured value with higher accuracy.

First, the computation equations shown above as equations for correcting a geometrical error are programmed in the computation processing unit 20. However, design values or practical numeric values are substituted for the variables.

Next, a master work (reference master) having a middle size in the measurement range is measured and the finger forming a portion of the arm member 12 and the probe are adjusted on the basis of the known size of the reference master to ensure that a correct measured value can be obtained.

Subsequently, a master work (large master) having a size corresponding to the upper limit of the measurement range is measured, and the difference (error) between the measured value computed by the programmed computation equations and the known actual size value of the large master is recorded.

Similarly, a master work (small master) having a size corresponding to the lower limit of the measurement range is measured and the error is recorded. Then, the square of the measurement error at the time of measurement of the large master and the square of the measurement error at the time of measurement of the small master are obtained and added together. That is, the sum of the squares of the errors is computed.

The values of the variables given at the time of programming of the computation equations are adjusted so that the error square sum here obtained is minimized. For adjustment of each variable, a numerical solution such as a Newton method or a repeating method using a computer is programmed. Each variable is thereby automatically optimized.

The computation equations thereby optimized are stored in the storage device 22 of the computation processing unit 20. In measurement subsequently made, the measured value computation device 23 of the computation processing unit 20 computes the measured value by using the optimized computation equations.

EXAMPLE

Design values shown by equations 2 below were substituted in computation equations 1 shown above.

$$L = 115$$

$$A = 9$$

$$R = 1.5$$

$$H = 26.5$$

$$S = 65$$

$$P = 0.02$$

$$X = 0$$

$$Y = 0$$

$$N = 1024 \qquad \text{(Equation 2)}$$

Figure 3:
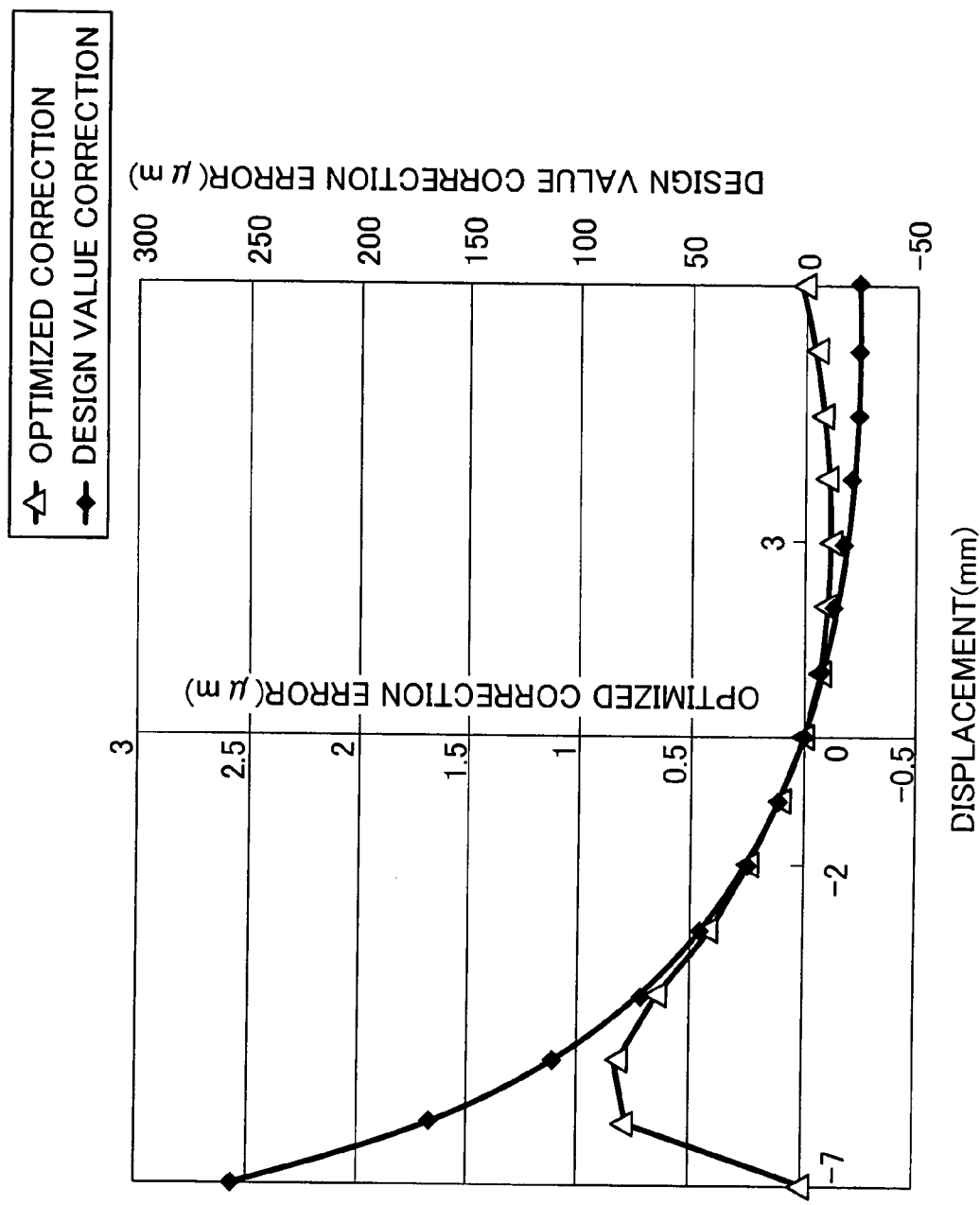
FIG. 3 is a graph showing an example of the present invention.

L, A and X in these design values are set as variables and optimized by the numerical solution. FIG. 3 shows comparison between the results of computation performed by only substituting the design values shown above in the computation equations and the results of computation performed by optimizing L, A and X in the design values and substituting the optimized values and the design values in the computation equations.

In the graph shown in FIG. 3, the abscissa represents the displacement (mm) of the probe 14 and the ordinate represents the measurement error (μm). In the graph, the curve of the plot using a rhombic symbol indicates the error in the measured value computed by the computation equations using the design values, while the curve of the plot using a triangular symbol indicates the error in the measured value computed by the computation equations using optimized L, A and X in the design values.

As shown in FIG. 3, the maximum error in the case of design value correction was 256 μm. In contrast, the maximum error in the case of optimized correction was 0.8 μm.

In the above-described embodiment, three master works: a reference master, a large master and a small master are used for optimization of the variables. However, optimization may be performed by using only two masters, i.e., a reference mater and a large master or a reference master and a small master, or three or more masters including one or more intermediate masters may be used to improve the accuracy.

While an implementation using the computation equations for correcting a geometrical error due to seesaw motion has been described, it is more advantageous to use computation equations factoring in bending of the lever system including the arm member 12, a shift of the position of the supporting point.

While an optical scale is used as the detector 16, an LVDT (differential transformer) may alternatively be used. However, it is preferable to form a model of the characteristics of the LVDT and to incorporate the characteristic model in the correction computation equations since the linearity of the LVDT through a wide range is not sufficiently high.

While correction computation equations in the case of measurement of a cylindrical work using a spherical-surface contact have been shown, computation equations suitable for any of various measurement methods, e.g., a method of measuring a flat work with a spherical contact and a method of measuring a cylindrical work with a bar contact may be prepared.

What is claimed is:

1. A measuring method in which a probe is brought into contact with a work to measure a size of the work, comprising:
    storing correction computation equations capable of correcting a geometrical measurement error in a seesaw measuring apparatus, the correction computation equations including design values related to the seesaw measuring apparatus;
    measuring a work and computing a first measured value using the correction computation equations;
    optimizing as variables, by a numerical solution, at least one of the design values in the correction computation equations so that an error between the computed measured value and a true value is minimized;
    storing optimized correction computation equations including the optimized variables; and
    computing a second measured value using the optimized correction computation equations in a subsequently performed measurements,
    wherein at least one of a master work having a size corresponding to an upper limit of a measurement range and a master work having a size corresponding to a lower limit of a measurement range is used.

2. A measuring method in which a probe is brought into contact with a work to measure a size of the work, comprising:
    storing correction computation equations capable of correcting a geometrical measurement error in a seesaw measuring apparatus, the correction computation equations including design values related to the seesaw measuring apparatus;
    measuring a work and computing a first measured value using the correction computation equations;
    optimizing as variables, by a numerical solution, at least one of the design values in the correction computation equations so that an error between the computed measured value and a true value is minimized;
    storing optimized correction computation equations including the optimized variables; and
    computing a second measured value using the optimized correction computation equations in a subsequently performed measurement,
    wherein at least one master work the size of which is known is measured and the variables are optimized based on a measurement of the at least one master work so that the difference between the measured value obtained and the known size is minimized,
    wherein at least two master works are measured, one of the at least two master works having a size corresponding to an upper limit of a measurement range and another of the at least two master works having a size corresponding to a lower limit of the measurement range.

3. A seesaw measuring apparatus comprising:
    an arm member having a probe at the arm member's end and supported on a supporting member so as to be pivotable on the supporting member,
    a detector, located on a side of the supporting member opposite the probe, configured to detect displacement of the probe by detecting the displacement of the arm member,
    a computation processing unit which computes a measured value from a detection signal from said detector, said computation processing unit having:
        a storage device which stores correction computation equations for correcting a geometrical measurement error in the seesaw measuring apparatus on the basis of design values;
        a measured value computation device which computes the measured value from the detection signal from said detector by using the correction computation equations; and
        an optimizing computation device which optimizes as variables, by a numerical solution, at least one of the design values in the correction computation equations so that an error between the computed measured value and a true value is minimized,
    wherein said storage device stores the optimized correction computation equations including the optimized variables, and said measured value computation device computes the measured value by using the optimized correction computation equations, and
    wherein at least one of a master work having a size corresponding to an upper limit of a measurement range and a master work having a size corresponding to a lower limit of a measurement range are detected by the detector.

4. A seesaw measuring apparatus comprising:

an arm member having a probe at the arm member's end and supported on a supporting member so as to be pivotable on the supporting member, a detector, located on a side of the supporting member opposite the probe, configured to detect displacement of the probe by detecting the displacement of the arm member, a computation processing unit which computes a measured value from a detection signal from said detector, said computation processing unit having:

a storage device which stores correction computation equations for correcting a geometrical measurement error in the seesaw measuring apparatus on the basis of design values;

a measured value computation device which computes the measured value from the detection signal from said detector by using the correction computation equations; and an optimizing computation device which optimizes as variables, by a numerical solution, at least one of the design values in the correction computation equations so that an error between the computed measured value and a true value is minimized, wherein said storage device stores the optimized correction computation equations including the optimized variables, and said measured value computation device computes the measured value by using the optimized correction computation equations, wherein at least one master work the size of which is known is measured and the variables are optimized based on a measurement of the at least one master work so that the difference between the measured value obtained and the known size is minimized, and wherein at least two master works are measured, one of the at least two master works having a size corresponding to an upper limit of a measurement range and another of the at least two master works having a size corresponding to a lower limit of the measurement range.

5. A measuring method, comprising:

measuring a work and computing a first measured value using correction computation equations including design values related to a seesaw measuring apparatus, the correction computation equations configured to correct geometrical error in a seesaw measuring apparatus;

optimizing at least one of the design values in the correction computation equations so that an error between the computed measured value and a true value is minimized; and computing a second measured value using the optimized correction computation equations in a subsequently performed measurement, wherein at least two master works are measured, one of the at least two master works having a size corresponding to an upper limit of a measurement range and another of the at least two master works having a size corresponding to a lower limit of the measurement range.

* * * * *